April 17, 1934.  E. MENDENHALL ET AL  1,954,824
VACUUM SURROUNDED MOTOR
Original Filed Nov. 7, 1927  2 Sheets-Sheet 1
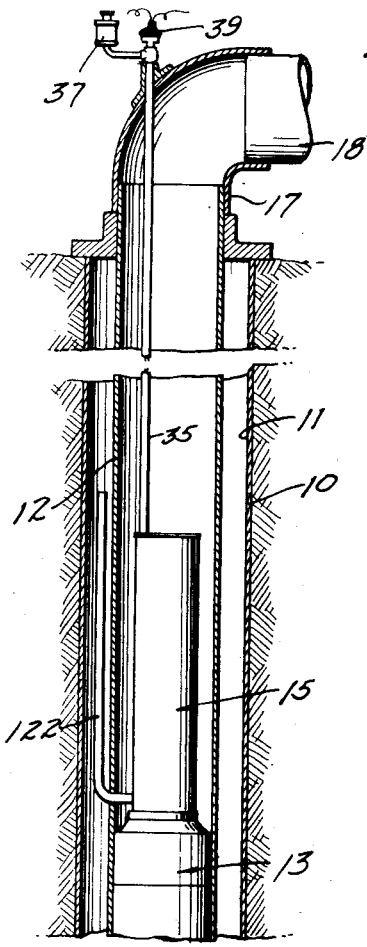
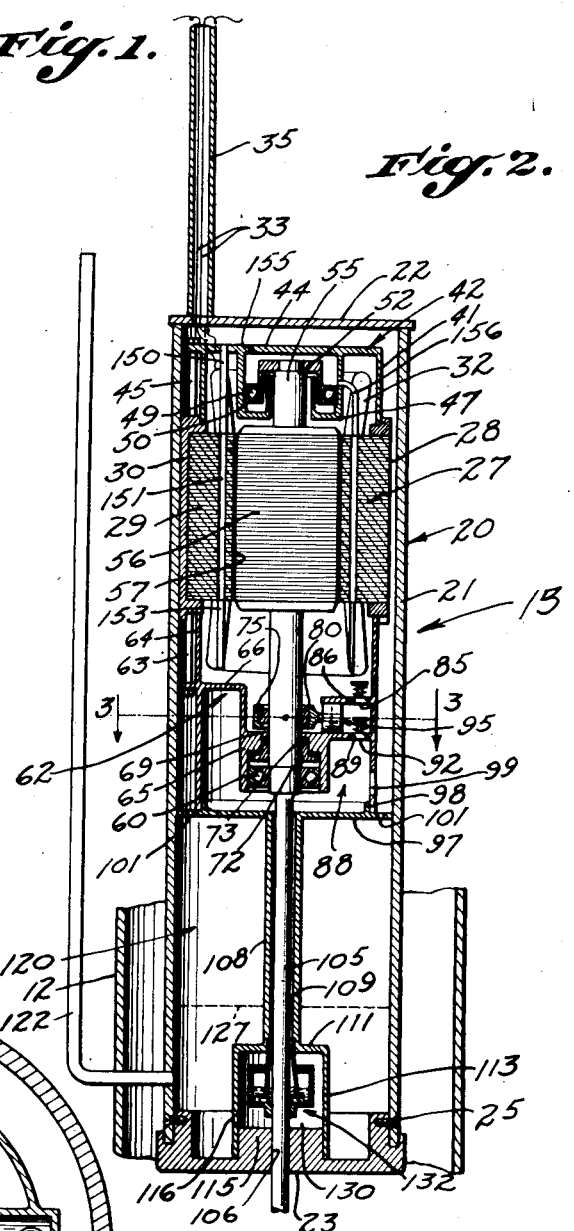
INVENTORS:
Earl Mendenhall,
Junius B. Van Horn,
BY
ATTORNEY.

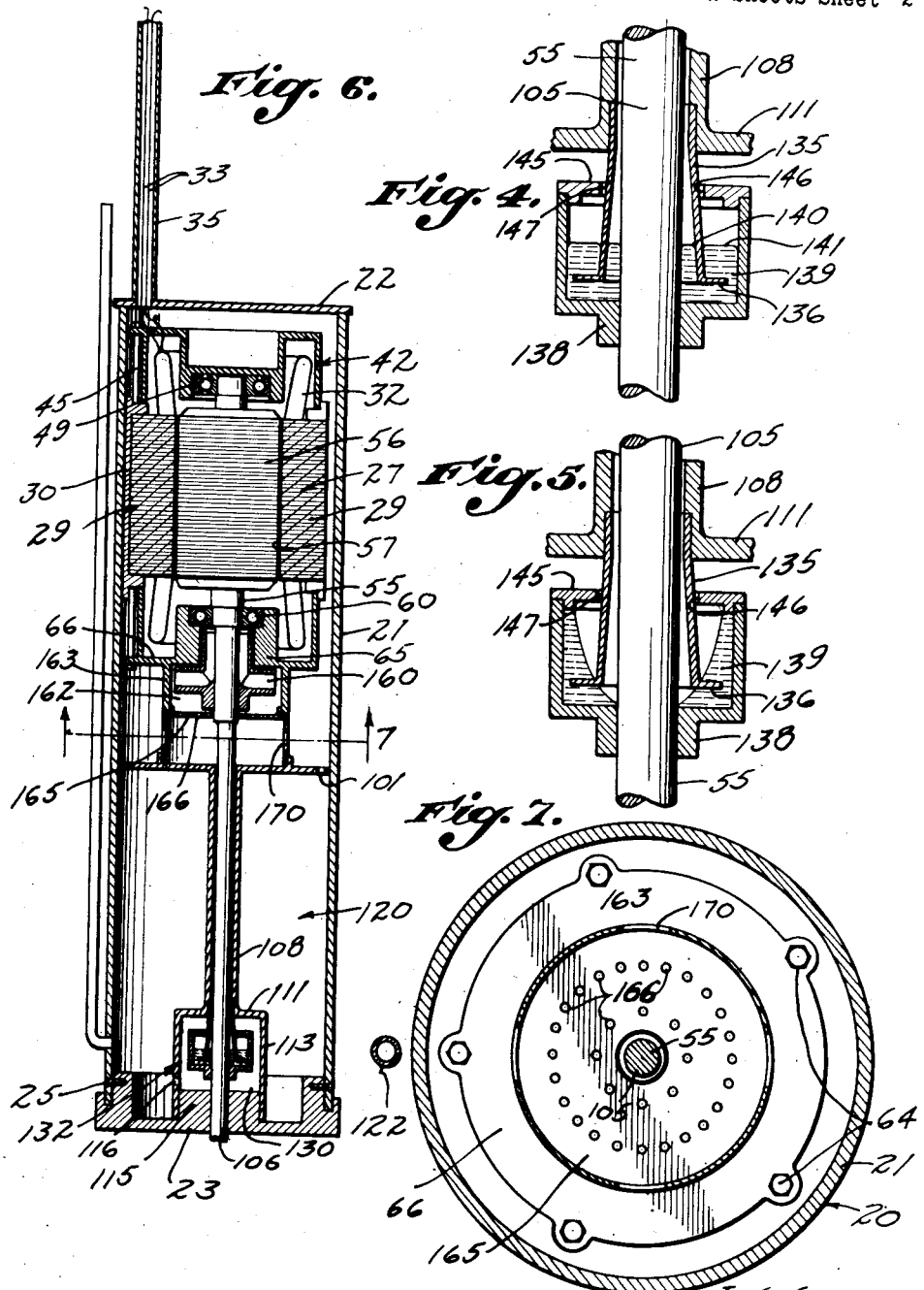

Patented Apr. 17, 1934

1,954,824

UNITED STATES PATENT OFFICE 1,954,824

VACUUM SURROUNDED MOTOR

Earl Mendenhall and Junius B. Van Horn, Los Angeles, Calif., assignors to Menhorn, Inc., Los Angeles, Calif., a corporation of California Application November 7, 1927, Serial No. 231,514
Renewed April 28, 1933

20 Claims. (Cl. 172—36)

Our invention relates to motors and more particularly to a submersible motor adapted to be filled with a neutral fluid, this fluid being exhausted from a space surrounding the rotor of the motor, allowing the rotor to operate in a partial vacuum.

Many attempts have been made to operate a motor submerged in a fluid which would be injurious to the working parts of the motor should it enter therein. In effecting this result, it is necessary to keep all of the external fluid, in which the motor is submerged, away from the working parts of the motor. Certain attempts have been made to force air under pressure into a motor shell, this compressed air being effective to force all the fluid from the chamber in which the motor is operated. Such an installation is open to very serious objections inasmuch as it is necessary to very thoroughly dry the air before forcing it into the motor. It is practically impossible to remove all the moisture from the air, and any moisture remaining therein will tend to condense upon the windings of the motor, thus causing serious damage thereto.

We have found it feasible to completely fill a motor chamber with a neutral fluid which is non-injurious to the windings of the motor. Such a neutral fluid must, of course, have high dielectric properties, and should have a relatively low viscosity. Operation with such an arrangement is entirely satisfactory except that considerable power is lost on high speed motor installations due to the viscosity of the oil in the gap of the motor which lies between the rotor and the stator, this gap being usually quite small.

We have found it possible to pump a portion of the neutral fluid from the gap and the space surrounding the rotor, leaving a partial vacuum therein. This we do by means of a pump operated by the turning of the shaft of the motor.

It is an object of our invention to provide a fluid-filled motor in which the space surrounding the rotor is adapted to be exhausted to remove any of the fluid, thus allowing the rotor to operate in a partial vacuum.

Another object of our invention is to provide a motor having a pump formed integral therewith for exhausting any fluid from the motor chamber.

In such a motor it is necessary to keep all traces of external fluid from the bearings of the motor.

Another of the objects of our invention is to provide a motor adapted to be submerged in an external fluid, this motor being so constructed as to keep all traces of the external fluid from the bearings of the motor.

Further objects and advantages of our invention will be made evident hereinafter.

The motor of our invention finds particular utility in the deep-well pumping art, but it should be understood that our motor finds equally important uses in other arts. We are, therefore, describing the motor of our invention with particular relation to the deep-well pumping art without limiting ourselves thereto.

In the drawings,

Fig. 1 indicates the motor of our invention attached to a pump in a deep-well pump installation.

Fig. 2 is a vertical cross-sectional view of the motor of our invention.

Fig. 3 is a horizontal sectional view taken along the line 3—3 of Fig. 2.

Fig. 4 is an enlarged vertical sectional view of the fluid-packed seal of our invention.

Fig. 5 is a vertical sectional view of this seal in operation.

Fig. 6 is an alternative form of our invention.

Fig. 7 is a horizontal cross-sectional view taken along the line 7—7 of Fig. 6.

Referring particularly to Fig. 1, a well casing 10 is set in a well 11. Extending downward in the well casing 10 is a discharge pipe 12 supporting a pump unit 13. A motor 15 of our invention is shown as being connected to the pump unit 13. When the motor 15 is energized, the pump unit 13 forces well fluid upward between the motor 15 and the discharge pipe 12 to the top of the discharge pipe, whence it is directed through an elbow 17 into a secondary discharge pipe 18.

Fig. 2 best shows the details of our invention. The motor 15 is surrounded by an outer shell 20. This outer shell comprises a cylindrical portion 21 closed at its top by a top plate 22 and at its bottom by a bottom plate 23. The top plate 22 is securely welded in place, and the apparatus inside the outer shell 20 is installed through the lower end thereof, this end being closed by the bottom plate 23 which is held in position by screws 25.

Supported in the upper end of the shell 20 is a stator 27 of the motor 15, having longitudinal grooves 28 around the periphery thereof. The stator 27 is preferably formed of laminations 29 enclosed in a sheath 30. The stator 27 has windings 32 which are energized by leads 33. These leads extend upward through a neutral-fluid supply pipe 35 communicating between the inside of the outer shell 20 and a neutral-fluid supply source indicated by the numeral 37 of Fig. 1. This neutral-supply source is located above the elbow 17 at the surface of the ground. The leads 33 extend from the top of the neutral-fluid supply pipe 35 through a pothead 39.

Extending upward from the sheath 30 is a cylindrical wall 41 of an upper bearing structure 42. A plate 44 extends across the upper end of the cylindrical wall 41. Screws 45 engage the plate 44 and are threadedly received by the sheath 30 of the stator 27. The upper bearing structure 42 forms a fluid-tight fit with the sheath 30. Extending downward from the plate 44 is an annular cup-shaped bearing support 47 carrying a thrust bearing 49 on an annular ledge 50 thereof. Also engaging the bearing 49 is a bearing cap 52 which is rigidly secured to a shaft 55.

The shaft 55 carries a rotor 56 in an opening 57 of the stator and extends downward through a bearing 60 carried by a lower bearing structure 62 which is secured to the lower end of the sheath 30 by bolts 63. The lower bearing structure 62 comprises a cylindrical wall 64 which engages the lower end of the sheath 30 in fluid-tight relationship. A radial wall 66 joins the cylindrical wall 64 with a cylindrical bearing-retaining member 65 which is adapted to hold the bearing 60. A wall 69 extends across the bearing-retaining member 65 and is threaded to receive a gland 72. The gland 72 is adapted to compress a packing 73 tightly around the shaft 55 and make a substantially fluid-tight joint between this shaft and an inner or motor shell formed by the sheath 30 in cooperation with the upper and lower bearing structures 42 and 62, this inner shell surrounding the motor and being surrounded by the outer shell 21.

Carried by the shaft 55 immediately above the wall 69 is an eccentric cam 75 secured to the shaft by a pin 77, as best shown in Fig. 3. Surrounding the cam 75, and adapted to be oscillated thereby, is a ring follower 80. The ring follower 80 is connected to a piston 81 which is adapted to reciprocate in a cylinder 82 formed in the lower bearing structure 62, as best shown in Figs. 2 and 3. The cylinder 82 communicates with the interior of the motor shell through an opening 85 closed by a spring-actuated poppet valve 86. This valve 86 is adapted to be opened to allow an escape of fluid from the motor shell into the cylinder 82 when the pressure in the former exceeds that in the latter. Communicating between an intermediate chamber 88 below the cylinder and the cylinder 82 is an opening 89 closed by a spring-actuated exhaust poppet valve 92. This poppet valve is adapted to open when the pressure in the cylinder 82 exceeds the pressure in the intermediate chamber 88. Thus it will be seen that as the piston 81 is drawn leftward a vacuum will be formed in the cylinder 82 and the poppet valve 86 will open to allow fluid from the interior of the motor shell to be drawn into the cylinder. On the return stroke of the piston, the pressure in the cylinder 82 will be raised, and the poppet valve 92 will open to release this excess of pressure, thus forcing the fluid into the intermediate chamber 88. The cam 75, the follower 80, the piston 81 and the associated cylinder and valves form a pump 95 of our invention.

An intermediate wall 97 extends across the outer shell 20. A ledge 98 thereof is adapted to engage the interior of the cylindrical wall 64. This cylindrical wall has one or more openings 99 communicating between the intermediate chamber 88 and the annular space surrounding the cylindrical wall 64. The intermediate wall 97 has openings 101 which also communicate with this annular space.

The shaft 55 has a reduced portion 105 which extends through the intermediate wall 97 and downward through an opening 106 in the bottom plate 23. Extending downward from the intermediate wall 97 is a tube 108 which is concentric with the reduced portion 105 of the shaft, there being a clearance space 109 therebetween. The lower end of the tube 108 has a radial flange 111 formed integral therewith. A cylindrical wall 113 extends downward from the radial flange 111 and engages a boss 115 of the bottom plate 23. An opening 116 is formed through the cylindrical wall 113 immediately above the boss 115. The lower end of the cylindrical portion 21 of the shell 20, together with the intermediate wall 97, the tube 108, the radial flange 111, the cylindrical wall 113, and the bottom plate 23 define a balance chamber 120. This balance chamber is in communication with the intermediate chamber 88 through the openings 99 and 101. The lower end of the balance chamber 120 communicates with a filling pipe 122 which extends outward through the discharge pipe 12 and upward to a point a short distance above the top 22 of the shell 20. In normal operation, the external fluid in the well can reach the lower portion of the balance chamber 120, and the neutral fluid supplied through the pipe 35 can reach the upper portion of the balance chamber 20 by passing through the grooves 28 in the stator and the openings 101 in the intermediate wall 97. These fluids have different specific gravities and are preferably immiscible so that a definite division line, indicated by the numeral 127, is effected between them.

The radial flange 111 together with the cylindrical wall 113 forms a sealing chamber 130 in which a fluid-packed seal 132 is mounted. This fluid-packed seal is most clearly shown by referring to Figs. 4 and 5. The seal itself comprises an apron 135 secured to and extending downward from the radial flange 111. The apron 135 is concentric with the axis of the shaft 55, and is flared outward at its lower end, as indicated in Fig. 4. On the lower end of the apron 135 is formed a flange 136. Secured to the reduced portion 105 of the shaft 55 is a cup 138 which rotates with the shaft when the motor is in operation. The cup 138 is adapted to surround the flange 136. The cup is substantially half filled with mercury indicated by the numeral 139, this mercury having a surface 140 in communication with the intermediate chamber 88 through the clearance space 109 and having a surface 141 in that portion of the cup 138 surrounding the apron 135. A cover 145 is suitably welded, or otherwise secured, to the top of the cup 138. The cover 145 has an opening 146 adapted to receive the apron 135, there being a clearance space 147 therebetween. The surface 141 of the mercury 139 is in communication with the lower portion of the balance chamber 120 through the clearance space 147 and the opening 116. It will thus be seen that the surface 140 is in contact with the neutral fluid in the shell 20, while the surface 141 is in contact with the external fluid of the well. When the motor is in operation the mercury surfaces 140 and 141 assume the parabolical shape indicated in Fig. 5. This is due to the high centrifugal force on the mercury 139. It should be noticed that the flange 136 is below the surface of the mercury 139 irrespective of the rotation of the shaft. The construction of this seal is not per se a part of the present invention, the details thereof being shown and claimed in our co-pending application Serial No. 225,182, filed October 10, 1927.

In installations where it is desirable to effect a greater cooling action than that obtained by the pumped fluid passing upward around the shell, it is possible to supply neutral fluid to ventilating ports in the stator. One or more pipes 150 may be secured to the plate 44, these pipes communicating between the space between the plates 22 and 44 and cooling ducts 151 passing longitudinally through the stator 27. Pipes 153 may be connected to the lower end of the stator, these pipes communicating with the ports 151. It is also desirable to have an opening 155 through the plate 44, this opening forming a valve means allowing neutral fluid to pass into the cup-shaped bearing support 47 and thus renew the supply therein. An overflow pipe 156 may conveniently communicate with one of the cooling ducts 151. The opening 155 and the pipes 150 are relatively small so that they will not too materially decrease the amount of vacuum in the motor shell and so that they will throttle the flow of neutral liquid thereinto, either one or more of the openings 155 or one or more of the pipes 150 thus constituting a throttle means. Any of the neutral fluid which reaches the interior of the motor shell through the opening 155 or the pipes 150 is also exhausted by the pump 95 and can circulate upward through the grooves 28 into a position where it can again pass through the ports 151. It will thus be apparent that we maintain a renewable body of neutral fluid in a storage chamber adjacent the motor shell, this storage chamber in the preferred embodiment of the invention comprising the space between the outer and motor shells, as well as the intermediate chamber 88. Neutral fluid is thus circulated through and withdrawn from the motor shell, being so guided therein that the rotor 56 is not surrounded by the neutral fluid, thus materially reducing the skin frictional losses.

In installing the motor of our invention, it is preferable to completely fill the interior of the outer shell 20 with neutral fluid through the pipe 35. To more clearly point out the operation of the device, however, we will assume that a portion of the external fluid is poured down the filling pipe 122 until the level in the balance chamber stands at the dotted line 127. At this time neutral fluid is poured through the pipe 35 until the outer shell 20 is substantially full. The motor is then lowered into the external fluid. As this is done, a fluid pressure is exerted on the liquid in the top of the filling pipe 122, this pressure being transmitted to the surface 127 separating the neutral fluid and the external fluid. As this external fluid pressure increases, the level 127 will rise, thus forcing neutral fluid back up the pipe 35. This rise of level in the pipe 35 will continue until the level therein is substantially the same as the level of the external fluid, or until the pressure heads on the two fluids at the level 127 are exactly equal. It should be noticed that the cross-sectional area of the pipe 35 is very much smaller than the cross-sectional area of the balance chamber 120 so that a relatively small movement of the surface 127 will cause a relatively large increase in level in the tube 35. This is extremely desirable inasmuch as it would be inadvisable to allow the surface 127 to rise up to or above the intermediate wall 97, inasmuch as in so doing it might come in contact with the bearing 60. It is entirely possible to make the balance chamber 120 of such dimension that no further neutral fluid need be supplied through the pipe 35 in order that the level in this pipe be at all times kept substantially the same as the level of the external fluid in the well. It is possible, however, to supply more neutral fluid to the pipe 35 and thus force the level 127 downward. During this installation period, it is probable that at least some leakage of internal fluid will occur past the valves 86 and 89 and past the packing 73. When the motor is energized by connecting the leads 33 to a suitable source of electrical potential, the shaft 55 rotates and carries the eccentric cam 75 therewith, thus reciprocating the piston 81 which operates in a manner previously described to pump any fluid out of the interior of the motor shell. Even should the motor shell become entirely filled with fluid the pump 95 will pump the greater portion of this fluid from the motor shell and will thus leave a partial vacuum therein in which the rotor 56 rotates without experiencing the impedance that it would if surrounded by oil or other neutral fluid.

The balance chamber 120 serves a triple purpose. First, it insures a level of neutral fluid in the supply pipe 35 which is substantially equal to the level of the external fluid of the well; second, it in itself or in conjunction with the remaining space filled with the neutral liquid forms a storage chamber or reservoir for any fluid that is pumped from the motor shell; and, third, it offers a means of equalizing the pressures between the neutral and the external fluids so that there is no tendency for the mercury 39 to be forced around the outer edges of the flange 136.

We have found that a reciprocating pump of the type disclosed in the preferred form of our invention is best adapted to act as a vacuum pump. It is entirely possible, however, to use a centrifugal pump in its place. Such a construction is illustrated in Figs. 6 and 7. Here an impeller 160 is securely attached to the shaft 55. The impeller 160 operates in an impeller chamber 162 formed by a cylindrical wall 163 extending downward from the radial wall 66. A plate 165 having interstices 166 closes the lower end of the impeller chamber 162. When the motor 15 is energized, the impeller 160 rotates with the shaft 55, thus drawing fluid from the interior of the motor shell and discharging it outward from the impeller 160 by centrifugal force. This fluid then passes through the interstices 166 and through an opening 170 in the cylindrical wall 163, whence it passes through the openings 101 into the top of the balance chamber 120.

This embodiment of our invention has the advantage that no stuffing-box is required and that there are no reciprocating parts to wear out. The vacuum created by such an impeller will not be as high, however, as that created by the reciprocating pump 95 shown in Figs. 2 and 3.

Certain of the features shown herein are disclosed and broadly claimed in co-pending applications. Thus, the balance system herein disclosed, including the balance chamber 120 and the neutral-fluid supply pipe 35 are specifically claimed in our co-pending application Serial 114,414, filed June 8, 1926, which application also specifically claims certain other features herein shown. The balance chamber supply pipe 35 is here novel, however, in combination with the circulating system shown.

We claim as our invention:

1. In a motor, the combination of: walls forming a motor chamber, said motor chamber containing a fluid; a shaft extending into said motor chamber; a rotor on said shaft; walls forming a piston chamber; a piston reciprocable in said piston chamber; a cam on said shaft; a follower surrounding said cam, said follower operating said piston; an intake valve communicating between said piston chamber and the interor of said motor chamber; and an exhaust valve communicating between said piston chamber and the exterior of said motor chamber.

2. In a submersible electric motor adapted to contain a neutral fluid, the combination of: an outer shell; walls defining a motor chamber in said outer shell; a shaft extending into said motor chamber; a rotor carried by said shaft; pump means for exhausting said fluid from said motor chamber into said outer shell; and means for preventing the escape from said outer shell of said neutral fluid which has been exhausted.

3. In a submersible electric motor adapted to contain a neutral fluid, the combination of: an outer shell; a motor shell in said outer shell; a shaft extending into said shells; a rotor carried by said shaft; pump means for exhausting said fluid from said motor shell into said outer shell; and walls forming a balance chamber in said outer shell, said balance chamber communicating at one end with said neutral fluid in said outer shell and at an opposite end with the external fluid in which said motor is submerged, said balance chamber being adapted to equalize the pressures of said fluids.

4. In a submersible electric motor adapted to be submerged in an external fluid, the combination of: an outer shell; a pipe communicating with the interior of said outer shell, said pipe extending above the surface level of said external fluid and being adapted to supply a neutral fluid to said outer shell; a motor shell in said outer shell; bearings supported by said motor shell; a shaft extending into said shells and journaled in said bearings; means for sealing the junction of said shaft and each of said shells; pump means actuated by said shaft tending to exhaust any of said neutral fluid from said motor shell, discharging same into said outer shell; and walls forming a balance chamber in communication with said external fluid and with said neutral fluid, in said outer shell, said balance chamber being adapted to equalize the pressures of said external and said neutral fluids.

5. In a submersible electric motor, the combination of: walls forming a motor chamber; means communicating with said motor chamber and through which a neutral liquid may enter said motor chamber; a motor including a rotor, said rotor being positioned in said motor chamber; a pump operated by said motor to reduce the pressure in said motor chamber and remove neutral liquid therefrom; walls forming an intermediate chamber into which said pump discharges; and walls forming a balance chamber containing pressure-equalized bodies of said neutral liquid and the external liquid in which said submersible electric motor is submerged, said balance chamber communicating with said intermediate chamber but defining a relatively quiet zone unaffected by turbulence in said intermediate chamber.

6. In a submersible electric motor, the combination of: an outer shell; a motor shell in said outer shell; a motor including a rotor, said rotor being in said motor shell; a shaft associated with said motor and extending through each of said shells; means for sealing said shaft and said outer shell in fluid-tight relationship; means for reducing the pressure on the inside of said motor shell to a value which is less than the pressure in the space therearound inside said outer shell; and means for substantially equalizing the pressures in the space between said shells and the pressure of the external fluid in which said outer shell is submerged.

7. In combination: a shell defining a storage chamber containing a neutral fluid; a motor shell; a rotor in said motor shell; a stator adjacent said rotor and provided with cooling ducts; a shaft adapted to be rotated by said rotor; pump means operated by the rotation of said rotor and adapted to intake from the interior of said motor shell and exhaust into said storage chamber; and means communicating with said neutral fluid in said storage chamber and conducting said neutral fluid through said cooling ducts of said stator.

8. In a motor structure, the combination of: walls defining a storage chamber containing a body of neutral liquid therein; a motor shell; a motor including a rotor, said rotor being in said shell; pump means operated by said motor and intaking from said motor shell to lower the pressure therein below the pressure in said storage chamber and exhausting neutral liquid from said motor shell, said pump means returning said neutral liquid directly to said storage chamber; and throttle means providing one or more relatively small openings communicating between the interior of said motor shell and said storage chamber, said means throttling a flow of said neutral liquid from said storage chamber into said motor shell.

9. A combination as defined in claim 8 including a bearing means for said motor, and including means conducting neutral liquid from said throttle means to said bearing means and into cooling relationship with said motor.

10. A combination as defined in claim 8 including a cup-shaped member in said motor shell and adapted to contain a body of neutral liquid entering said motor shell through said throttle means, and including cooling ducts through a portion of said motor and through which said neutral liquid may flow from said cup-shaped member.

11. In a submersible structure adapted to be submerged in an external liquid, the combination of: a shell defining a chamber; a rotatable shaft journalled in said chamber; pump means operated by a rotation of said shaft for withdrawing a neutral fluid from said chamber; and pressure transferring means for transferring pressure between said external liquid adjacent said submersible structure and the discharge of said pump means.

12. In combination: an outer shell providing a storage chamber containing a neutral fluid; an inner shell in said outer shell; an electric motor including a rotor, said rotor being in said inner shell; pipe means communicating with said neutral fluid and conducting this neutral fluid into said inner shell in cooling relationship with said motor, said pipe means communicating with the interior of said inner shell; and pump means intaking from the interior of said inner shell and discharging into said storage chamber for forcing said neutral fluid through said pipe means.

13. In a submersible motor, the combination of: an electric motor including a rotor and a stator; submerged walls enclosing said rotor and providing a motor chamber; submerged walls defining a storage chamber exterior of said motor chamber, said storage chamber containing a body of neutral liquid there being an opening in said walls defining said motor chamber whereby a portion of said neutral liquid can flow into said motor chamber when said motor is not operating; pump means operated by the operation of said electric motor and intaking from said motor chamber and discharging into said storage chamber whereby neutral liquid is pumped from said motor chamber into said storage chamber, said storage chamber being large enough to contain the neutral liquid pumped from said motor chamber.

14. A combination as defined in claim 13 in which said storage chamber includes a pipe in open communication with said neutral liquid and in which said neutral liquid can rise.

15. In a submersible electric motor structure adapted to be submerged in an external fluid, the combination of: a shell containing a body of neutral liquid; an electric motor in said shell; a shaft on said motor and extending through a wall of said shell; sealing means for sealing said shaft with respect to said shell and separating said neutral liquid and said external fluid; pressure-equalizing means communicating with both said neutral liquid and said external fluid and equalizing the pressures on opposite sides of said sealing means; and pump means operated by a rotation of said shaft for maintaining in a portion of said shell a pressure different from the pressure at which said neutral liquid and said external fluid are equalized.

16. In a submersible electric motor structure adapted to be submerged in an external fluid, the combination of: a shell containing a body of neutral liquid; an electric motor in said shell; a shaft on said motor and extending through a wall of said shell; sealing means for sealing said shaft with respect to said shell and separating said neutral liquid and said external fluid; pressure-equalizing means communicating with both said neutral liquid and said external fluid and equalizing the pressures on opposite sides of said sealing means; pump means operated by a rotation of said shaft for maintaining in a portion of said shell a pressure different from the pressure at which said neutral liquid and said external fluid are equalized; and walls forming a closed circulation path extending in cooling relation with said electric motor, the differential pressure set up by said pump means circulating said neutral liquid through said circulation path.

17. In a submersible electric motor adapted to be submerged in an external liquid, the combination of: an outer shell containing a neutral liquid; an inner shell in said outer shell; a rotor in said inner shell and including a rotatable shaft extending from said inner shell; and an impeller operatively connected to said shaft and positioned at the junction of said shaft and said inner shell and providing passages in communication with the interior and exterior of said inner shell, a rotation of said impeller withdrawing neutral liquid from said inner shell and discharging it into the space outside said inner shell but inside said outer shell.

18. In a submersible electric motor, the combination of: an outer shell containing a neutral liquid and surrounded by an external liquid which is relatively cool, said outer shell including an inner surface; a stator positioned in said outer shell; walls defining one or more passage means extending longitudinally with respect to said stator; a rotor positioned to be rotated by said stator, said rotor and stator comprising an electric motor; a shaft operatively connected to said rotor; sealing means for sealing the junction of said shaft and said outer shell; a cylindrical wall extending from one end of said stator and spaced from said inner surface of said shell to provide an annular space communicating with said passage means; and pump means operated by the rotation of said rotor to circulate said neutral liquid in a closed path including said annular space and said passage means whereby said neutral liquid cools said motor and is itself cooled by contact with the inner surface of said shell while moving through said annular space.

19. In a submersible electric motor, the combination of: a shell contacted on the outer surface by a cool external liquid and containing a neutral liquid, said shell including an inner surface; an electric motor in said shell and providing a rotor and a stator, at least certain peripheral portions of said stator being smaller in diameter than said inner surface of said shell whereby a passage means is provided therebetween; pump means operated by said rotor for circulating said neutral liquid from one end of said stator to the other through said passage means and for returning said neutral liquid to the first end in cooling relationship with said stator to flow through a closed path a portion of which path is along said inner surface of said shell whereby the heat taken into said neutral liquid is withdrawn by conduction through said shell and into said external liquid therearound.

20. In a submersible motor, the combination of: an outer shell positioned beneath the surface of an external liquid and containing a body of neutral liquid; an inner shell in said outer shell; an electric motor including a rotor, said rotor being positioned in said inner shell; a shaft operatively connected to said rotor and extending through both said inner and said outer shells; a sealing means for sealing the junction of said shaft and said outer shell; means communicating with both said external liquid and said neutral liquid for substantially equalizing the pressures on opposite sides of said sealing means; a second sealing means at the junction of said shaft and said inner shell; and pump means for setting up a pressure differential on opposite sides of said second sealing means.

EARL MENDENHALL.
JUNIUS B. VAN HORN.